(12) United States Patent
Eaton

(10) Patent No.: US 8,453,339 B2
(45) Date of Patent: Jun. 4, 2013

(54) LASER BEAM DELIVERY IN A SPATIAL MEASURING DEVICE

(76) Inventor: Homer L. Eaton, Carlsbad, CA (US)

( * ) Notice: Subject to any disclaimer, the term of this patent is extended or adjusted under 35 U.S.C. 154(b) by 0 days.

(21) Appl. No.: 13/596,763

(22) Filed: Aug. 28, 2012

(65) Prior Publication Data

US 2013/0081294 A1     Apr. 4, 2013

Related U.S. Application Data

(60) Division of application No. 13/069,306, filed on Mar. 22, 2011, now Pat. No. 8,250,772, which is a continuation-in-part of application No. 12/866,674, filed as application No. PCT/US2009/032549 on Jan. 30, 2009, now Pat. No. 8,191,274, which is a continuation-in-part of application No. 12/027,935, filed on Feb. 7, 2008, now Pat. No. 7,587,834.

(51) Int. Cl.
*G01B 5/008* (2006.01)

(52) U.S. Cl.
USPC ................................. 33/503; 33/DIG. 21

(58) Field of Classification Search
USPC .................... 33/503, 556, DIG. 21
See application file for complete search history.

(56) References Cited

U.S. PATENT DOCUMENTS

| | | | | |
|---|---|---|---|---|
| 4,679,326 A * | 7/1987 | Takizawa et al. | | 33/558 |
| 5,063,334 A * | 11/1991 | Tanita et al. | | 318/67 |
| 5,131,166 A * | 7/1992 | Weber | | 33/503 |
| 5,758,429 A * | 6/1998 | Farzan et al. | | 33/503 |
| 7,227,647 B2 * | 6/2007 | Ferger | | 33/503 |
| 7,293,365 B2 * | 11/2007 | McMurtry et al. | | 33/556 |
| 7,587,834 B2 * | 9/2009 | Eaton | | 33/503 |
| 7,694,426 B2 * | 4/2010 | Heiden et al. | | 33/503 |
| 8,006,398 B2 * | 8/2011 | McFarland et al. | | 33/503 |
| 8,191,274 B2 * | 6/2012 | Eaton | | 33/503 |
| 8,250,772 B2 * | 8/2012 | Eaton | | 33/503 |
| 2002/0000047 A1 * | 1/2002 | Yoda et al. | | 33/503 |
| 2002/0029485 A1 * | 3/2002 | Pettersson | | 33/503 |
| 2003/0019119 A1 * | 1/2003 | Sato et al. | | 33/503 |
| 2009/0013549 A1 * | 1/2009 | Lutz | | 33/503 |
| 2009/0031572 A1 * | 2/2009 | Boesser et al. | | 33/503 |
| 2011/0283553 A1 * | 11/2011 | McFarland et al. | | 33/503 |
| 2012/0084989 A1 * | 4/2012 | Pettersson et al. | | 33/503 |

* cited by examiner

*Primary Examiner* — G. Bradley Bennett
(74) *Attorney, Agent, or Firm* — Charmasson, Buchaca and Leach, LLP

(57) ABSTRACT

A coordinate measuring robotic device includes a housing movably supported on a base and mounting a vertical pillar along which rides a carriage engaged by a horizontally translating arm carrying a probe. The movement of the housing, carriage, and probe can be driven by motors in the housing transmitted by a cable and pulley assembly. Tools such as a laser beam emitter can be located on the arm and supplied with laser light by a plurality of mirrors positioned on the device.

25 Claims, 8 Drawing Sheets

LASER BEAM DELIVERY IN A SPATIAL MEASURING DEVICE

PRIOR APPLICATION

This is a divisional of U.S. patent application Ser. No. 13/069,306, filed 2011, Mar. 22, now U.S. Pat. No. 8,250,772, issued 2012 Aug. 28, which is a continuation-in-part of U.S. patent application Ser. No. 12/866,674, filed 2010 Nov. 15, now U.S. Pat. No. 8,191,274, issued 2012 Jun. 5, which is a U.S. entry (371) of International Application Ser. No. PCT/US2009/032549 filed 2009 Jan. 30 which is a continuation of U.S. patent application Ser. No. 12/027,935 filed 2008 Feb. 7 now U.S. Pat. No. 7,587,834, issued 2009 Sep. 15.

FIELD OF THE INVENTION

This invention relates to apparatuses for determining the coordinate values of a point on a workpiece, and relates more specifically to mechanisms for precisely positioning a probe or tool mounted on an articulated arm.

BACKGROUND

Coordinate measuring apparatuses are commonly used in many industries to analyze the contour of a workpiece or to verify manufacturing compliance with specifications. In a first type of apparatus, a probe is mounted on an articulated, multi-axis measurement arm. The probe is manually brought in contact with a point on a workpiece to verify its Cartesian coordinates. The probe can also be dragged along a contoured surface in order to determine its spherical or cylindrical coordinates. Digital encoders installed within each articulation of the arm generate orientation signals that are fed to a data processor which extracts from those signals the desired coordinate values. An example of this first type of coordinate measuring apparatus is disclosed in my U.S. Pat. No. 5,829,148 incorporated herein by this reference.

In a second type of coordinate measuring apparatus, the probe mounted on a multi-axis adjustable support is automatically driven into contact with the workpiece by computer-controlled motors which directs the movement of various structural elements of the apparatus that are orthogonally oriented in reference to one another. Optical or tactile sensors mounted within the probe stop the movement of the pillars or arms when contact with the workpiece is established. An example of this second type of coordinate measuring apparatus is disclosed in U.S. Pat. No. 5,134,782 incorporated herein by this reference.

Due to the multiple components, particularly moving parts, present in the first type of coordinate measuring machine, high precision is seldom achieved. This type machine is also particularly sensitive to temperature variations. The second type of coordinate measuring machine tend to be sturdier, have a limited number of coordinate-transferring parts and, accordingly, can provide higher precision. However, they are also bulkier, heavier and more complex.

The instant invention results from an attempt to devise a lightweight, yet precise coordinate measuring device which can be adapted to operate as a robotic tool by taking advantage of new material having improved capabilities.

SUMMARY

The principal and secondary objects of the invention are to provide an improved spatial measurement or robotic arm device.

These and other objects are achieved by directing a measuring probe or the tip of a tool by the translation of some supporting components along two nonparallel axes. In some embodiments those axes can be substantially orthogonal. In some embodiments a linearly translating base component is provided. In some embodiments a rotating base component is provided. In some embodiments a linearly translating and rotating base component is provided. In some embodiments the components are maneuvered by cable and pulley mechanisms driven by electrical motors under the control of a data processor. In some embodiments a complex routing of the cables automatically accommodates for the displacement of the primary moving elements without affecting the positioning of the secondary element more remotely positioned on the machine.

In some embodiments of the invention the motors are omitted and the probe is manually brought to the locus to be measured.

In some embodiments there is provided a device which comprises: a base; a platform movably supported on said base; a pillar fixedly mounted on said platform and extending along a first axis; a carriage translatable along, and supported by said pillar; a cross-arm slidingly engaged upon said carriage, translatable about a second axis perpendicular to said first axis and having a first extremity; and, encoders for indicating the linear position of said carriage along said first axis, the linear position of said arm along said second axis, and the angular position of said housing in relation to said base.

In some embodiments the device further comprises: a turret secured to said first extremity; a body within said turret, said body being rotatable about a third axis; and, an encoder for indicating the angular position of said body about said third axis.

In some embodiments said platform is rotationally or translationally supported on said base.

In some embodiments said device further comprises at least one tool mounted at said first extremity.

In some embodiments said tool comprises a sensing element.

In some embodiments said sensing element comprises an imaging apparatus.

In some embodiments said device further comprises a shaft coupled at a first end to said body and a tool mounted at an opposite end of said shaft.

In some embodiments said shaft projects in a direction parallel to and spaced apart from said third axis.

In some embodiments said tool comprises a sensing probe; and whereby said probe may be positioned at a locus on a workpiece and the spacial coordinates of said locus may be determined from indications of said encoders.

In some embodiments said device further comprises a second probe secured to a second extremity of said arm.

In some embodiments said device further comprises: a motorized mechanism for rotating said platform and pillar about said first axis; first and second motors, each of said motors having a driving pulley; a plurality of direction-altering pulleys associated with said pillar and carriage; and flexible, elongated elements engaging said pulleys to translate said carriage up and down said pillar and bilaterally translate said arm about said carriage.

In some embodiments said flexible elongated elements comprises cables made of braided, small cross-diameter steel strands surrounded by a spiraling larger cross-diameter wire; each of a plurality of said pulleys has a cable-engaging peripheral groove incised with hatchings shaped and dimensioned to mesh with sections of said wire.

In some embodiments said device further comprises: a third motor, said motor having a first driving pulley; and, flexible, elongated elements engaging said pulley to rotate said body about said third axis.

In some embodiments said device further comprises: a shaft extending from said body about said third axis; an axle extending coaxially with said shaft; a driving sheave attached to a proximal end of said axle; a fourth motor having a second driving pulley; flexible, elongated elements engaging said second driving pulley to rotate said axle about said third axis; a first bevel gear attached to a distal end of said shaft; a second bevel gear coupled to said first bevel gear; a finger attached at a proximal end by said second bevel gear; an encoder for indicating the angular position of said finger; and, a tool at a distal end of said finger.

In some embodiments said tool comprises a radiation emitter.

In some embodiments said device further comprises: a laser source; a plurality of mirrors positioned about said arm and finger to reflect a beam issuing from said laser source through said finger.

In some embodiments said device further comprises a control unit activating said motors and automatedly positioning said tool in space.

In some embodiments said control unit is further adapted to run said tool along a path.

In some embodiments said control unit activates said motors and automatically positions said tool in contact with at least one point on a workpiece surface.

In some embodiments said control unit is adapted to coordinate said linear positions and said position of said housing.

In some embodiments said control unit is further adapted to intermittently position said tool on a series of discrete points on said surface.

In some embodiments said elongated elements comprise cables made of synthetic plastic material.

In some embodiments a first of said flexible elongated elements comprises a cable secured at both ends to said carriage and engaging a first direction-altering pulley in an upper region of said pillar, a second direction-altering pulley in a lower region of said pillar and one of said direction-altering pulleys being driven by a first of said motors.

In some embodiments said cross-arm further comprises a second extremity opposite said first extremity; and wherein a second of said flexible elongated elements comprises a cable secured at opposite ends to said first and second extremities respectively, running up and down portions of said pillar above and below said carriage, and engaging a pulley driven by a second of said motors.

In some embodiments said device further comprises: a cable and pulley mechanism linking said body to one of said motors, and wherein said mechanism comprises a close-loop cable running up and down portions of said pillar above and below said carriage.

In some embodiments said device is exhibiting a diametral accuracy of no greater than two microns and a linear accuracy of no greater than five microns.

DESCRIPTION OF THE EXEMPLARY EMBODIMENTS

Figure 1:
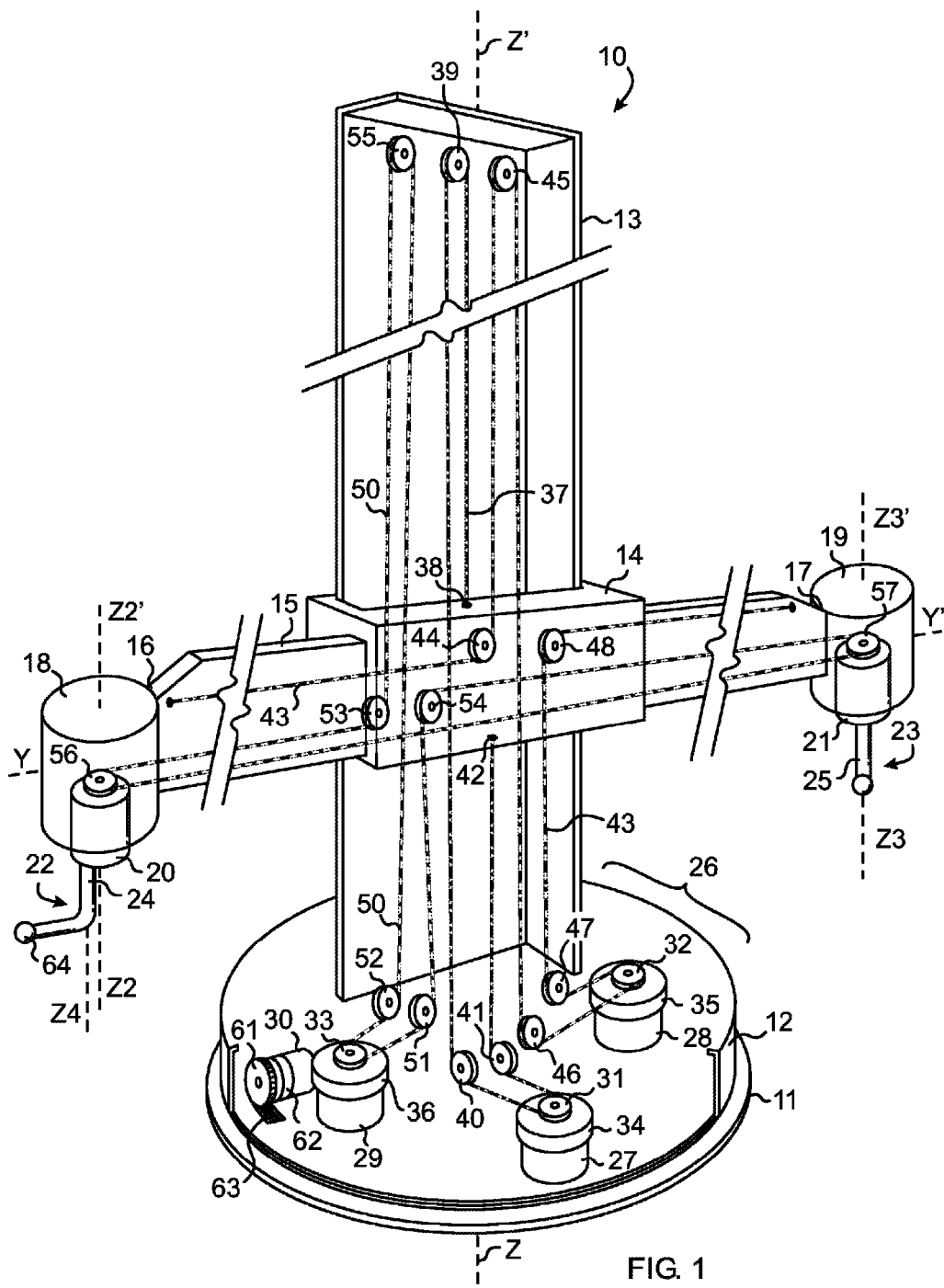
FIG. 1 is a diagrammatical, perspective illustration of an exemplary embodiment of the primary mechanical elements of a coordinate measuring apparatus according to the invention.

Referring now to the drawing, there is shown in FIG. 1 a coordinate measuring device 10 which comprises a stationary base 11 upon which is rotatively mounted a housing 12 about a first axis Z,Z'. The housing acts as a movable platform for a hollow tubular pillar 13 secured to the top of the housing. The pillar can extend vertically and coaxially with the housing. A carriage 14 is supported by the pillar and can be translated vertically along the length of the pillar. An horizontal hollow tubular cross-arm 15 is engaged into the carriage and can be translated bi-directionally along a second, horizontal axis Y. Secured to each extremity 16,17 of the arm is a turret 18,19 housing a body 20,21 rotating about a third, vertical axis Z2,Z2' or Z3,Z3'. A tactile probe 22,23 has a shaft 24,25 snapped into the lower end of the rotating body 20,21. An electro-mechanical assembly 26 in the housing 12 is linked to the carriage 14, the cross-arm 15 and to the rotating bodies 20,21 by a series of cables and pulleys forming linkages to motor drives. The electro-mechanical assembly 26 includes four electrical motors 27,28,29,30. Three of the motors 27,28, 29 drive pulleys 31,32,33 either directly or through speed reducers 34,35,36 depending on the type of motors selected.

The first motor 27 controls the up-and-down movement of the carriage 14. A cable 37, is connected at a first end to a part 38 of the carriage. The cable extends vertically inside the pillar 13 up to its top section where it passes over a pulley 39 which alters the cable's direction downward toward the bottom section of the pillar where its direction is altered to a horizontal position by another pulley 40 the cable then engages the motor pulley 31. From another direction-altering pulley 41, the cable rises upwardly toward the carriage where it is secured at its opposite end to another part 42. It will be understood that when the first motor 27 is activated, depending upon its direction of rotation, the carriage 14 will be translated up or down the length of the pillar 13.

The second motor 28 controls the bi-directional translation of the arm 15 with respect to the carriage by way of a second cable 43. The cable 43 is attached at a first end to a first extremity 16 of the arm, then engages a direction-altering pulley 44 and ascends within the pillar toward its top region where it engages another direction-alternating pulley 45 before descending down into the housing 12. There, after engaging a third direction-alternating pulley 46 it engages pulley 32 driven by the second motor 28. The cable 43 is then directed by pulley 47 toward the carriage 14 where a sixth pulley 48 directs it towards the other extremity 17 of the arm where its opposite end is attached. It should be noted that by having the cable 43 run up and down the portions of the pillar located above and below the carriage 14, the cable remains taut and the translational position of the arm can remain fixed during movement of the carriage along the pillar 13.

The third motor 29 controls the orientation of the rotating bodies 20, 21 by way of a third cable 50. The cable 50 forms a continuous closed loop and is engaged by a pulley 33 associated with the motor 29, and is directed by the direction-altering pulleys 51,52,53,54 and 55 toward pulleys 56 and 57 associated with the rotating bodies 20, 21 respectively. It is important to note that by having the cable 50 run up and down the pillar 13 through the series of pulleys according to a scheme similar to that used in connection with the control of the arm 15, the cable 50 remains taut and the rotational positions of the rotating bodies 20 and 21 can remain fixed during movement of the carriage 14 along the pillar 13.

The fourth motor 30 drives a gear 61 through a speed reducer 62 if necessary. The gear 61 meshes with a track 63 in the base 11 causing the housing 12 and pillar to rotate about the vertical axis Z,Z'. It should be noted that the axles of pulleys 44, 48, 53, and 54 are secured to the carriage 14. Pulleys 40, 41, 46, 47, 51, and 52 can be mounted on axles secured to the housing 12 or to the pillar 13.

The axis Z4 of the probe shaft 24 is preferably parallel and slightly spaced apart from the axis Z2,Z2' of the rotating body 20 and pulley 55. By oscillating the rotating movement of the third motor 29 over an arc of less than 180 degrees, the tip 64 of the probe 22 can be imparted with a vibrating motion which allows for the measurement of a plurality of discrete points on the surface of a workpiece as the probe is driven along a path on said surface.

It is important to note the driven movement of the carriage, arm, and rotating bodies occurs in absence of any driving motors located in the carriage, arm, or rotating bodies themselves, thus eliminating the weight and heat sources of motors and power supply lines in these structures. In this way the device, in some embodiments, can be made to weigh less than 12 kilograms, and be battery powered, and thus portable, while still providing up to a 5500 cubic centimeter measuring volume, and 5 micron far range accuracy, and 2 micron near range accuracy. It has been found that an assembly of cables and pulleys offers a more economical way to drive and control the various components and articulations of the disclosed device.

Figure 2:
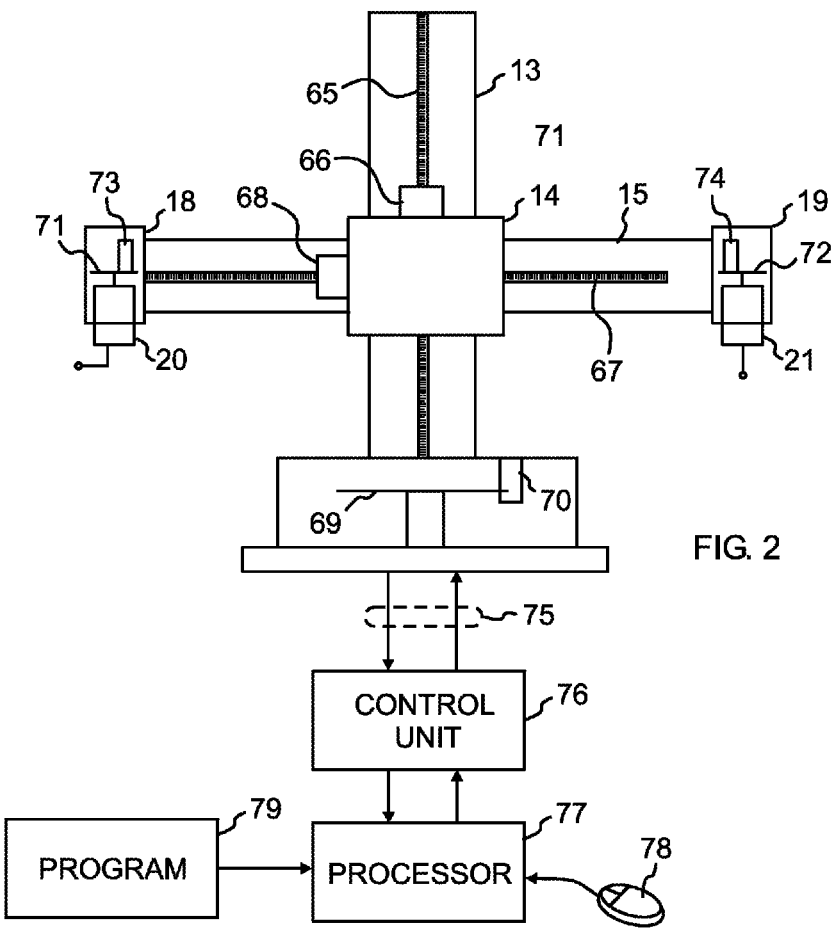
FIG. 2 is a diagrammatical illustration of the entire apparatus.

Referring now to FIG. 2, the position and angular orientation of the various elements can be provided by electronic encoders made of optical detectors reading patterned scales or optical disks. A first linear scale 65 positioned along the length of the pillar 13 is read by a first optical detector 66. A second scale 67 along the cross-arm 15 is read by a second optical detector 68. Both detectors are mounted on the carriage 14. An optical disk 69 associated with the base 11 is read by a third optical sensor 70 associated with the housing 12. Similar optical disks 71,72 associated with the rotating bodies 20, 21 are read by optical sensors 73,74 associated with the turrets 18 and 19. Signal conductors 75 from the various sensors and detectors and to the motors are connected to a control unit 76 which includes all the electronic and servo-system assemblies necessary to energize and direct the movement of the motors in response to the signals received from the various detectors and sensors, and the commands generated by an automatic data processor 77. The processor responds to signals provided by a manual entry device 78 or responds to instructions defining measurement routines provided by computer programs 79. Accordingly, either one of the probes can be directed to contact any surface within the reach of the device and to provide accurate coordinates of any point contacted by any one of the probes on a workpiece.

Figure 3:
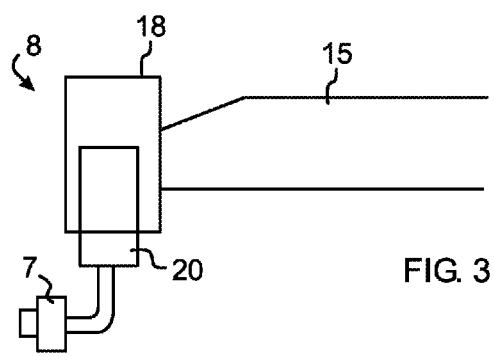
FIG. 3 is a diagrammatical illustration of an imaging probe.

In an alternate embodiment 8 of the probe illustrated in FIG. 3, the tactile sensor of the previous embodiment is replaced by a camera 7 or other imaging device. The image signal generated by the camera are fed to the processor operating under an image recognition computer program.

It should be understood that the mechanical linkage between the motors and the carriage, cross-arm and rotating bodies could be implemented by means of meshing gears, chains, and other obviously equivalent elements. Further, the apparatus can be adapted so that the translational axis of the arm is not orthogonal to the translational axis of the carriage on the pillar. In other words, the pillar can be oriented at a non-vertical angle and the arm oriented at a non horizontal angle. Of course care must be taken to properly track the movements in such orientations.

Figure 4:
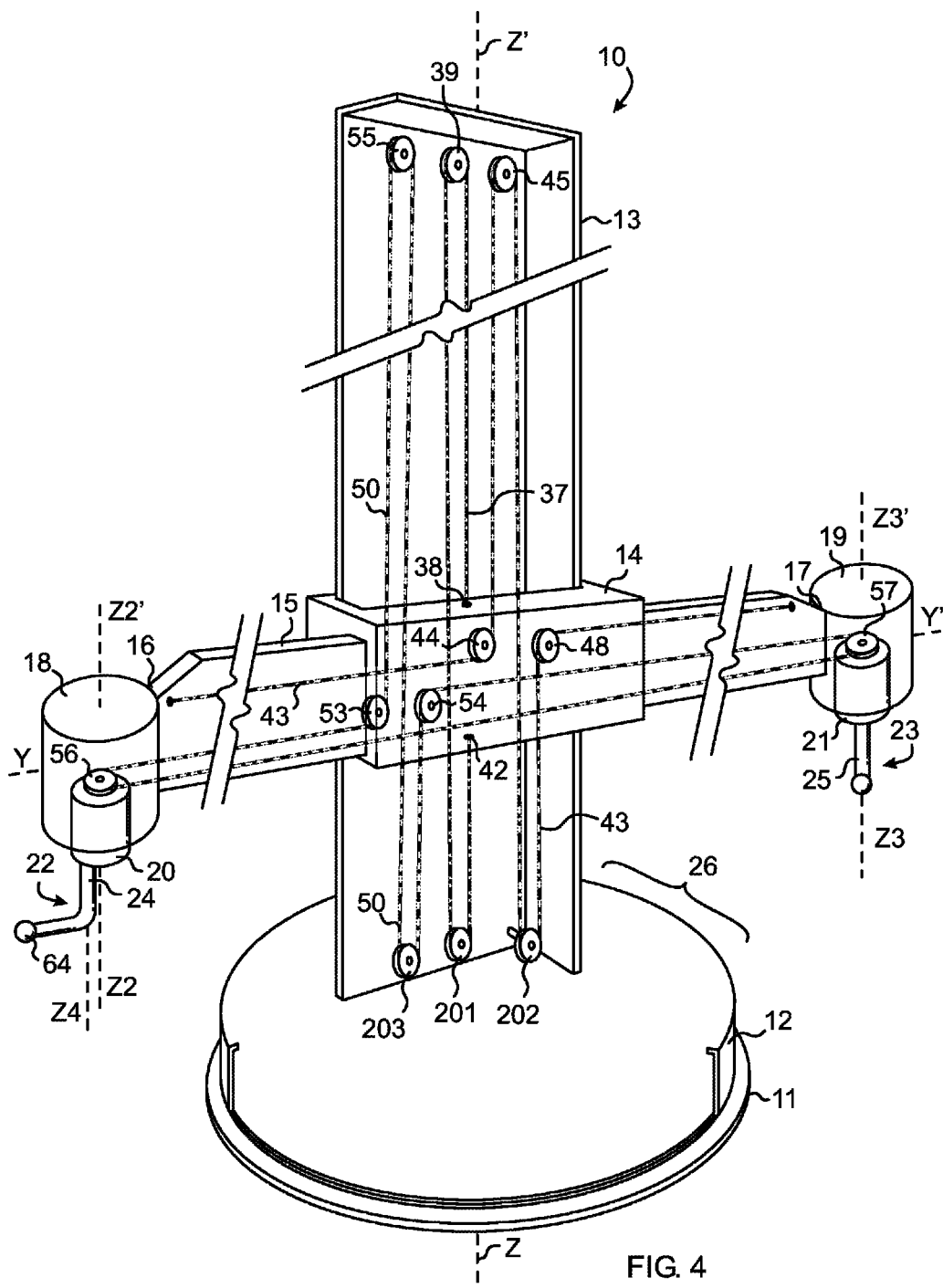
FIG. 4 is a diagrammatical illustration of a hand-driven coordinate measurement apparatus.

Referring now to FIG. 4, by replacing in the device of FIGS. 1-3 the motors 27, 28, and 29 and their speed reducers 32, 33, 34 with pulleys 201, 202, 203 and suppressing motor 30 and its speed reducer 62, one creates a manually driven coordinate measurement apparatus wherein one of the tactile probes 22, 23 can be hand-moved into contact with a locus on a work piece in order to determine the spacial location of the locus, or dragged along a contoured surface in order to determine its spatial surface characteristics. The indications supplied by the various optical detectors 66, 68, 70 and 73 or 74 are converted to for example Cartesian coordinates by the control unit 76.

Figure 5:
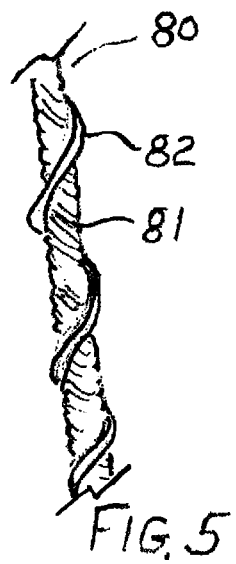
FIG. 5 is a perspective view of a length of cable.
Figure 6:
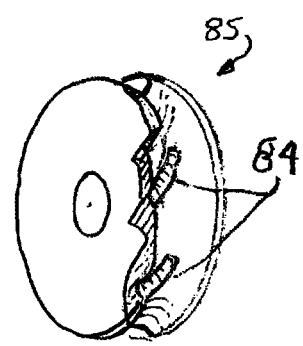
FIG. 6 is a perspective view of a pulley having a cut-away portion exposing the groove hatchings.

Referring now to FIGS. 5-6, in order to palliate some of the disadvantages, such as slippage and dilatation, inherent to some cable and pulley systems, there is provided an exemplary embodiment which utilizes a type of cable 80 made of twisted or braided small cross-diameter multi strands 81 of synthetic material surrounded by a spiraling larger cross-diameter wire 82 of the same material as illustrated in FIG. 5. Preferably, this type of cable is made from a synthetic plastic material such as SPECTRA brand high molecular weight polyethylene fiber available from Honeywell International Inc., of Morristown, N.J. Moreover, as shown in FIG. 6, each of the pulleys 85 can have peripheral groove 83 incised with hatchings 84 shaped and dimensioned to mesh with sections of the spiraling wire.

The use of such a cable and pulley system allows for measurements of spacial coordinates with no more than two micron diametral accuracy and no more than five micron linear accuracy.

The device is particularly adapted to operate a robotic structure translating and positioning a work head or tool about a workpiece. The working head may consist of, for example, a material-depositing nozzle, a welding electrode, a heating element, a radiation source such as an excimer laser beam, a cauterizing tip, an ultrasound or infrared radiation emitter, or a phaco-emulsifier tip used in cataract operations. A laser beam, the most complex of these tools, is exemplarily disclosed.

Figure 7:
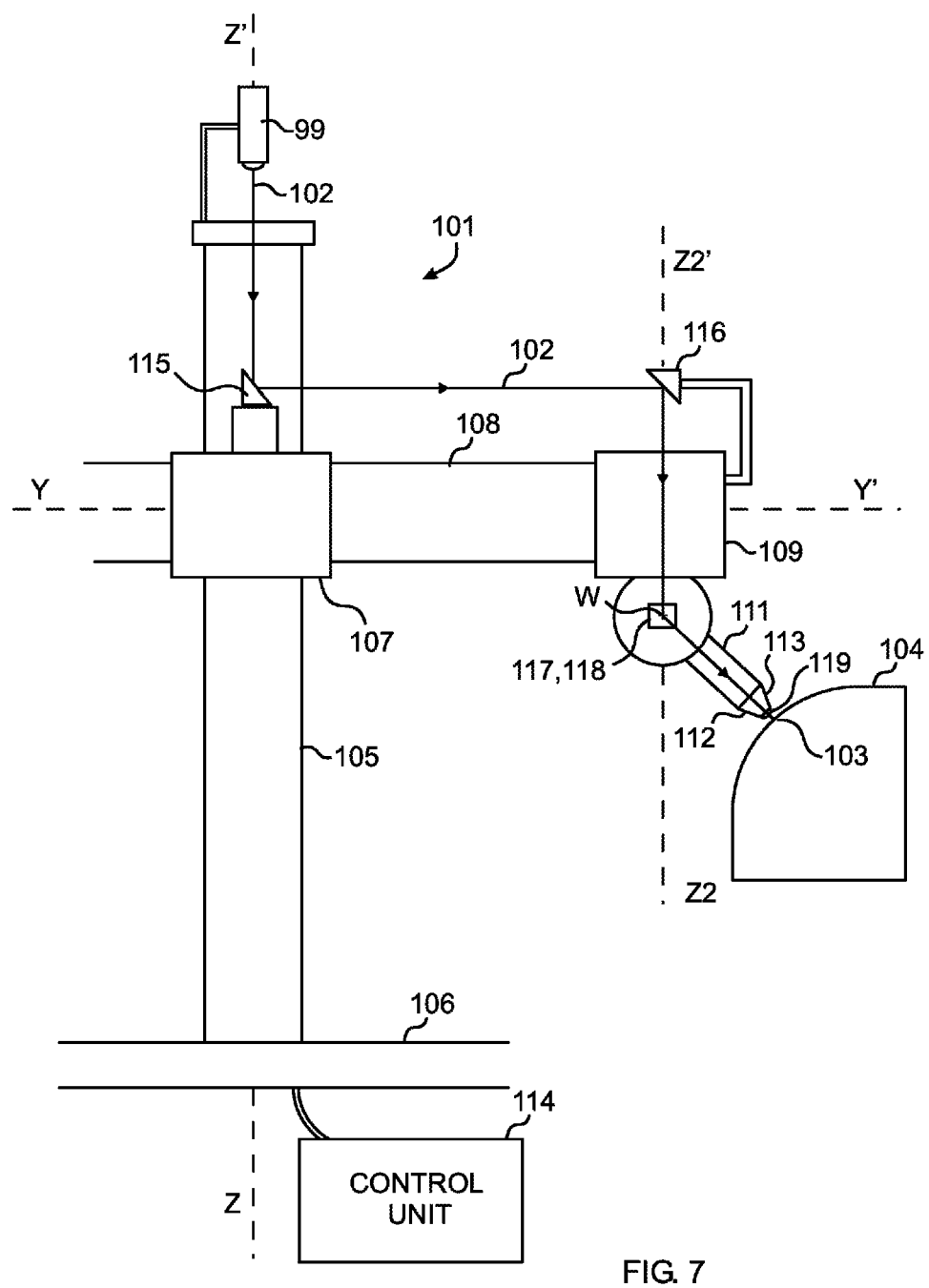
FIG. 7 is a diagrammatical illustration of a robotic tool.

As diagrammatically illustrated in FIG. 7, the device of FIGS. 1-3 may be transformed into a robotic structure 101 for applying a laser beam 102 at a specific locus 103 on a workpiece 104.

The structure includes a pillar 105 rotatable over a base 106 about a vertical axis Z,Z' (first articulation). Carriage 107 can be moved up and down the pillar along the same axis Z,Z' (second articulation). An arm 108 is translatable across the carriage along a horizontal axis Y,Y' (third articulation). A turret 109 mounted at one of the extremities of the arm houses a cylindrical body 110 rotatable about a second vertical axis Z2,Z2' (fourth articulation). Finally, a finger 111 is appended to the cylindrical body can be swung about a second horizontal axis W,W' (fifth articulation). A radiation emitter 112 at the distal end 113 of the finger is activated as explained below.

It should be understood that five encoders, each associated with one of the above articulations provides a control unit 114 with accurate orientation information about the relevant movable component of the structure. The control unit uses this information to accurately position the radiation emitter 112 on the locus 103 by activation of the driving motor, cable and pulley mechanism.

The laser beam generator 99 is preferably mounted on top of the pillar 105, but could also be remotely located and focused on the axis Z,Z' of the pillar. Angled mirrors 115, 116, 117, and 118 respectively mounted on the carriage 107, turret 109 and finger 111 guide and aim the laser beam 102 toward a objective lens 119 at the distal end of the radiation emitter 112.

Figure 8:
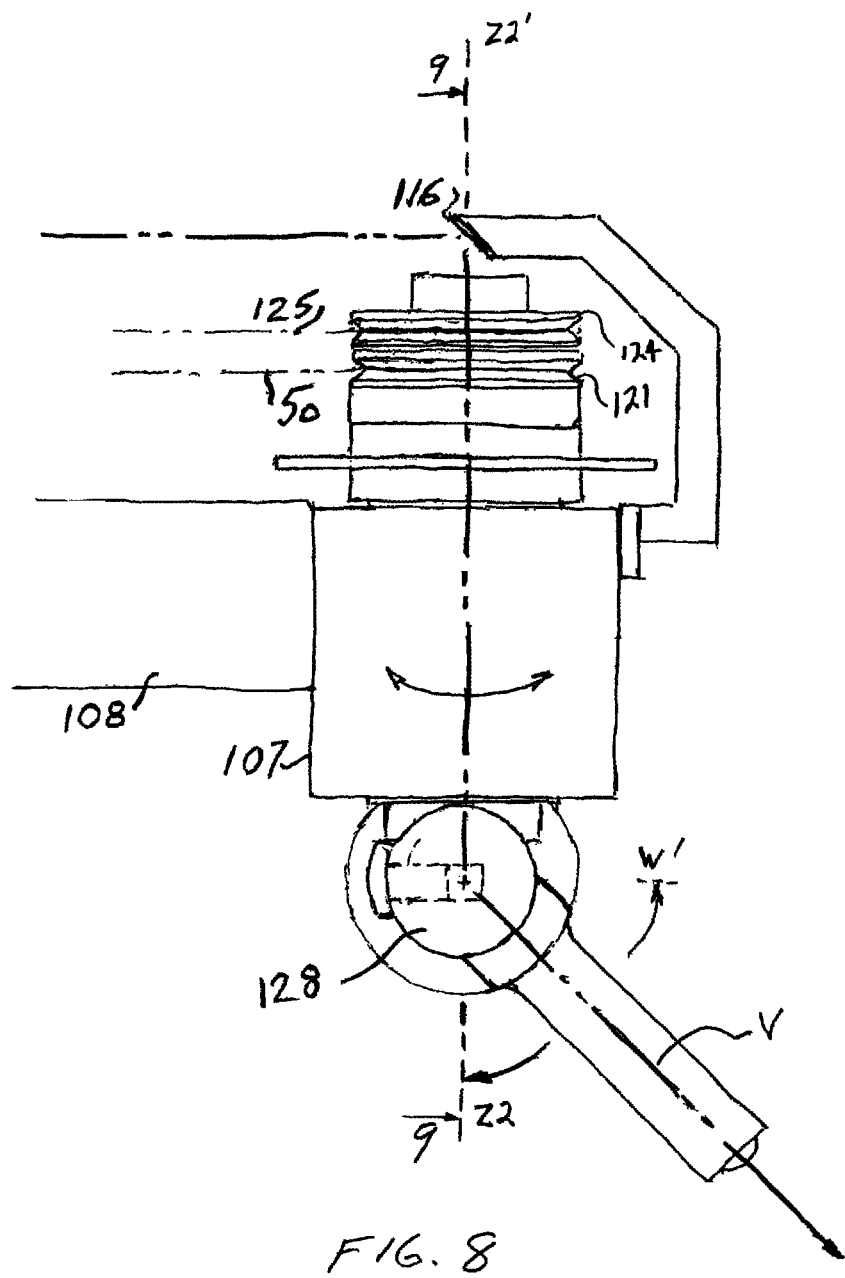
FIG. 8 is a side view of a turret and laser beam emitter.
Figure 9:
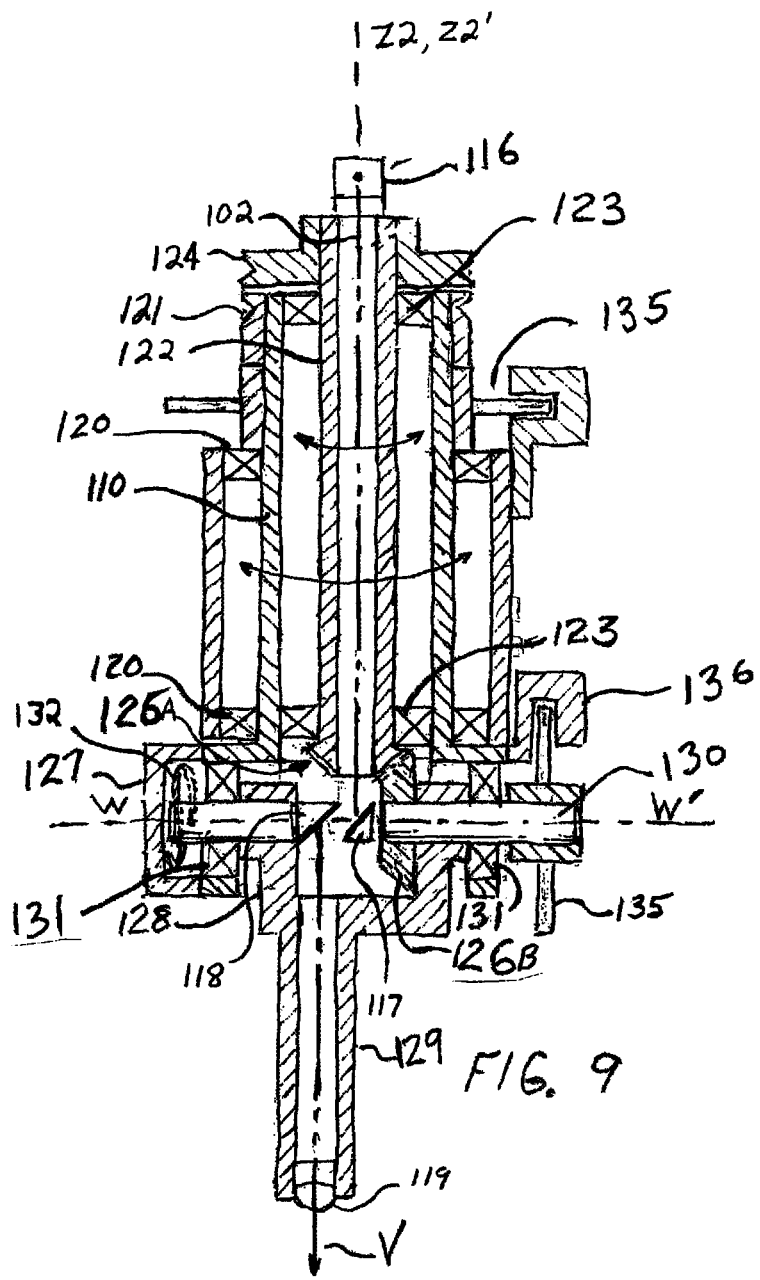
FIG. 9 is a cross-sectional view taken along line 9-9 of FIG. 8.

The turret 109 and the its rotating body 110 are more specifically illustrated in FIGS. 8 and 9. The rotating cylindrical body 110 is coaxially journaled within the turret 109 by two pairs of bearings 120. The body is capped by a pulley 121 driven by cable 50. Mounted coaxially inside the cylindrical body is a tubular shaft 122 also supported by 2 pairs of bearings 123. The upper part of the shaft is journaled within the hub of a sheave 124 driven by an additional cable 125 similar to and running along the body-driving cable 50. A bevel gear 126A formed at the lower rim of the shaft 122 is enmeshed with a second bevel gear 126B which controls the movement of the finger 111.

The finger is mounted in a housing 127 integral with the turret 109, and comprises a circular head 128 from which projects the tubular tip 129. The head is held into the housing by an axle 130 supported by a pair of bearings 131. A twisted leaf-spring 132 is provided at one end of the shaft to minimize rotational backlash. The elongation axis V of the finger is slightly displaced laterally from the axis Z2,Z2' of the turret and cylindrical body. Two angled mirrors 117, 118 are used to reflect the laser beam 102 down the center of the finger during operational articulation of the turret structures. The angular orientations or the cylindrical body and finger are dectected and encoded by encoder disk and reading head assemblies 135 and 136 respectively.

Figure 10:
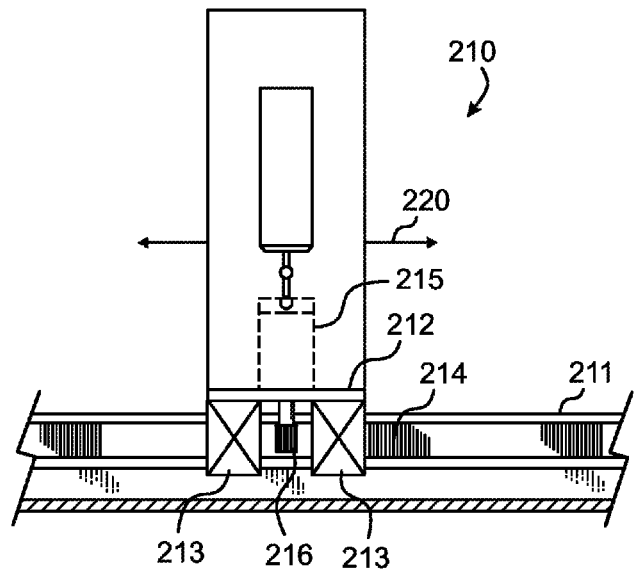
FIG. 10 is a diagrammatical elevational side view illustration of a linearly translating measuring apparatus.
Figure 11:
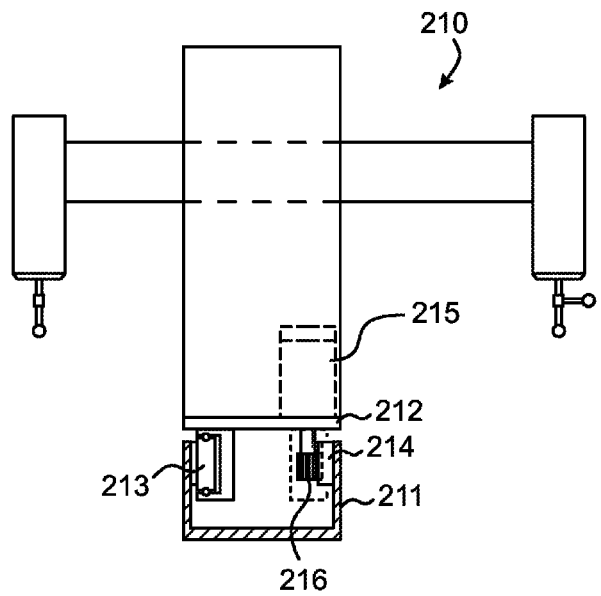
FIG. 11 is a diagrammatical elevational end view illustration of the apparatus of FIG. 10.

Referring now to FIGS. 10 and 11 there is shown an alternate embodiment of the device 210. By replacing in the device of FIGS. 1-3 the rotational base 11 with an elongated base 211, the housing platform 212 can be translationally moved 220 along the base. The housing can be mounted to a number of linear bearing modules 213 allowing the housing platform to be slidingly secured to the base. By replacing in the device of FIGS. 1-3 the circular track 63 with a linear track 214, the motor 215 can have its gear 216 oriented to engage the track and drive the housing translationally along the base. Alternately, the gear can be replaced with a capstan-style friction drive. It shall be understood that the base track can be curved similar to a railroad track and follow a curved rather than linear path. Care will be required to avoid curves below a minimum bend radius and spatially track changes in the location of the housing in accordance with its changing position on the base.

While some of the exemplary embodiments of the invention have been described, modifications can be made and other embodiments may be devised without departing from the spirit of the invention and the scope of the appended claims.

What is claimed is:

1. A device which comprises:
a base;
a platform movably supported on said base;
a pillar fixedly mounted on said platform and extending along a first axis;
a carriage translatable along, and supported by said pillar;
a cross-arm slidingly engaged upon said carriage, translatable about a second axis perpendicular to said first axis and having a first extremity;
encoders for indicating the linear position of said carriage along said first axis, the linear position of said arm along said second axis, and the angular position of said housing in relation to said base;
a laser source; and,
a plurality of minors positioned about said arm to reflect a beam issuing from said laser source through said mirrors toward said first extremity.

2. The device of claim 1, which further comprises:
a turret secured to said first extremity;
a body within said turret, said body being rotatable about a third axis; and
an encoder for indicating the angular position of said body about said third axis.

3. The device of claim 2, wherein said device further comprises at least one tool mounted at said first extremity.

4. The device of claim 3, wherein said tool comprises a sensing element.

5. The device of claim 4 wherein said sensing element comprises an imaging apparatus.

6. The device of claim 2, which further comprises a shaft coupled at a first end to said body and a tool mounted at an opposite end of said shaft.

7. The device of claim 6, wherein said shaft projects in a direction parallel to and spaced apart from said third axis.

8. The device of claim 7, wherein said tool comprises a sensing probe; and whereby said probe may be positioned at a locus on a workpiece and the spacial coordinates of said locus may be determined from indications of said encoders.

9. The device of claim 8, which further comprises a second probe secured to a second extremity of said arm.

10. The device of claim 2, which further comprises:
a motorized mechanism for rotating said platform and pillar about said first axis;
first and second motors, each of said motors having a driving pulley;
a plurality of direction-altering pulleys associated with said pillar and carriage; and flexible, elongated elements engaging said pulleys to translate said carriage up and down said pillar and bilaterally translate said arm about said carriage.

11. The device of claim 10, wherein said flexible elongated elements comprises cables made of braided, small cross-diameter steel strands surrounded by a spiraling larger cross-diameter wire;
each of a plurality of said pulleys has a cable-engaging peripheral groove incised with hatchings shaped and dimensioned to mesh with sections of said wire.

12. The device of claim 10 which further comprises:
a third motor, said motor having a first driving pulley; and,
flexible, elongated elements engaging said pulley to rotate said body about said third axis.

13. The device of claim 12 which further comprises:
a shaft extending from said body about said third axis;
an axle extending coaxially with said shaft;
a driving sheave attached to a proximal end of said axle;
a fourth motor having a second driving pulley;
flexible, elongated elements engaging said second driving pulley to rotate said axle about said third axis;
a first bevel gear attached to a distal end of said shaft;
a second bevel gear coupled to said first bevel gear;
a finger attached at a proximal end by said second bevel gear;

an encoder for indicating the angular position of said finger; and a tool at a distal end of said finger.

14. The device of claim 13, wherein said tool comprises a radiation emitter.

15. The device of claim 13, which further comprises a control unit activating said motors and automatedly positioning said tool in space.

16. The device of claim 15, wherein said control unit is further adapted to run said tool along a path.

17. The device of claim 16, wherein said control unit activates said motors and automatically positions said tool in contact with at least one point on a workpiece surface.

18. The device of claim 17, wherein said control unit is adapted to coordinate said linear positions and said position of said housing.

19. The device of claim 18, wherein said control unit is further adapted to intermittently position said tool on a series of discrete points on said surface.

20. The device of claim 2, wherein said elongated elements comprise cables made of synthetic plastic material.

21. The device of claim 10, wherein a first of said flexible elongated elements comprises a cable secured at both ends to said carriage and engaging a first direction-altering pulley in an upper region of said pillar, a second direction-altering pulley in a lower region of said pillar and one of said direction-altering pulleys being driven by a first of said motors.

22. The device of claim 21, wherein said cross-arm further comprises a second extremity opposite said first extremity; and wherein a second of said flexible elongated elements comprises a cable secured at opposite ends to said first and second extremities respectively, running up and down portions of said pillar above and below said carriage, and engaging a pulley driven by a second of said motors.

23. The device of claim 22, wherein said device further comprises:

a cable and pulley mechanism linking said body to one of said motors, and wherein said mechanism comprises a close-loop cable running up and down portions of said pillar above and below said carriage.

24. The device of claim 13, exhibiting a diametral accuracy of no greater than two microns and a linear accuracy of no greater than five microns.

25. The device of claim 1, wherein said platform is rotationally or translationally supported on said base.

* * * * *